(12) United States Patent
Sugioka (10) Patent No.: US 8,425,750 B2
(45) Date of Patent: Apr. 23, 2013

(54) FLUID STRUCTURE CONTROL DEVICE

(75) Inventor: Hideyuki Sugioka, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 324 days.

(21) Appl. No.: 12/836,413

(22) Filed: Jul. 14, 2010

(65) Prior Publication Data

US 2011/0011735 A1     Jan. 20, 2011

(30) Foreign Application Priority Data

Jul. 17, 2009    (JP) ................. 2009-169375

(51) Int. Cl.
*G01N 27/453*     (2006.01)

(52) U.S. Cl.
USPC ........................................... 204/643

(58) Field of Classification Search ......... 204/547, 204/643

See application file for complete search history.

(56) References Cited

U.S. PATENT DOCUMENTS 7,081,189 B2    7/2006   Squires et al.
7,708,872 B2 *   5/2010   Eidsnes et al. ................ 204/451

OTHER PUBLICATIONS

Zhemin Wu dissertation entitled "Nonlinear Induced-Charge Electrokinetics," Graduate School of Vanderbilt University, Dec. 2008, 120 pages.*
S.Gangwal, O.J.Cayre, M.Z.Bazant, and O.D.Velev: Induced-Charge Electrophoresis of Metallodielectric Particles, Phys. Rev. Lett., V. 100, 058302, Cambridge, Massachusetts 02139, USA, Feb. 8, 2008.
T.C.Halsey, and W.Toor: Structure of Electrorheological Fluids, Phys. Rev. Lett., V. 65, No. 22, Chicago, Illinois 60637, USA, 1990.

* cited by examiner

*Primary Examiner* — Alex Noguerola
(74) *Attorney, Agent, or Firm* — Canon U.S.A., Inc., IP Division (57) ABSTRACT

A fluid structure control device has a liquid chamber holding a solution containing an electrolyte dissolved therein and conductive particles dispersed in the solution, and a pair of electrodes for applying an AC voltage to the conductive particles in the liquid chamber. Electro-osmotic flows are caused to occur due to electric double layers induced at the interface between the solution and the conductive particles by application of a voltage, thereby producing interaction among the conductive particles to displace the conductive particles and change reversibly the dispersion state of the conductive particles in accordance with the applied voltage.

10 Claims, 7 Drawing Sheets

FLUID STRUCTURE CONTROL DEVICE

BACKGROUND OF THE INVENTION

1. Field of the Invention

The present invention relates to a fluid structure control device which is applicable to an actuator, a fluid viscosity controller, a fluid valve, or the like. More specifically, the present invention relates to a fluid structure control device utilizing induced-charge electro-osmosis.

2. Description of the Related Art

Micro-pumps utilizing electro-osmosis are used in the technical fields of μ-TAS (micro-total analysis system) and the like owing to the simple structure thereof having no moving parts and the ease of installation in a micro-sized flow channel.

Recently, micro-pumps utilizing induced-charge electro-osmosis are attracting attention owing to possibility of achieving a high flow rate of liquid, possibility of AC driving to inhibit a chemical reaction between electrode and a liquid, and so forth.

U.S. Pat. No. 7,081,189 (hereinafter referred to as Document-1) discloses two types of pumps (1) and (2) utilizing induced-charge electro-osmosis: (1) a half coat type ICEO pump which has a metal post placed between a pair of electrodes, wherein the metal post is coated half with a thin dielectric film, thereby limiting the region of electric charges induced in the metal post to control the flow of a liquid; and (2) an asymmetric metal post-shape type ICEO pump which has a metal post in a triangular or like asymmetric shape between a pair of electrodes to control the liquid flow in one direction.

S. Gangwal, O. J. Cayre, M. Z. Bazant, and O. D. Velev: Phys. Rev. Lett., 100, 058302 (2008) (hereinafter referred to as Document-2) discloses displacement of polystyrene particles coated partially with a gold film perpendicularly to an electric field.

T. C. Halsey, and W. Toor: Phys. Rev. Lett., 65, 2820 (1990) (hereinafter referred to as Document-3) discloses displacement of dielectric particles by utilizing polarization (dipole) induced in the dielectric particles upon application of a voltage to the particles in a non-conductive solvent.

SUMMARY OF THE INVENTION

The above Document-1 discloses a pump utilizing induced-charge electro-osmosis, but does not disclose the control of the properties of a fluid by displacing conductive particles in the fluid and changing the structure of the fluid.

The above Document-2 discloses the displacement of conductive particles, but does not disclose formation of a structure of conductive particles in the fluid by interaction of the conductive particles with each other.

The above Document-3 discloses arrangement of dielectric particles dispersed in a non-polarizable insulating fluid like a silicone oil by mutual interaction among the particles due to electric dipole moments generated between the particles upon application of a voltage, but does not use any conductive liquid like an electrolyte solution.

In the application of the fluid structure control device to a living body or a biological field, as for the application to micro TAS and DNA analysis, if the properties of a fluid can be controlled in an electrolyte solution such as water and an aqueous KCl solution, not in an insulating fluid like a silicone oil, the device can be used in wider variety of applications.

In view of the above-mentioned prior art technique, the present invention is completed which provides a fluid structure control device which is capable of changing the dispersion state of conductive particles in an electrolyte solution by applying an AC voltage to the conductive particles.

The fluid structure control device of the present invention comprises a liquid chamber holding a solution containing an electrolyte dissolved therein and conductive particles dispersed in the solution, and a pair of electrodes for applying an AC voltage to the conductive particles in the liquid chamber; said device causing electro-osmotic flows to occur due to electric double layers induced at the interface between the solution and the conductive particles by application of a voltage, thereby producing interaction among the conductive particles to displace the conductive particles and to change reversibly the dispersion state of the conductive particles in accordance with the applied voltage.

The fluid structure control device of the present invention is capable of changing reversibly the dispersion state of the conductive particles or conductive composite particles in the electrolyte solution by application of an AC voltage to the particles to produce fluid-dynamic interaction among the particles due to electro-osmotic flows caused by electric double layer. The properties of the fluid such as the viscosity, electric conductivity, refractive index, and optical polarizability can be controlled by the change of the dispersion state of the conductive particles.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

The fluid structure control device of the present invention comprises a liquid chamber holding a solution containing an electrolyte dissolved therein and conductive particles dispersed in the solution, and a pair of electrodes for applying an AC voltage to the conductive particles in the liquid chamber; said device causing electro-osmotic flows to occur due to electric double layers induced at the interface between the solution and the conductive particles by application of a voltage, thereby producing interaction among the conductive particles to displace the conductive particles and to change reversibly the dispersion state of the conductive particles in accordance with the applied voltage.

Figure 1:
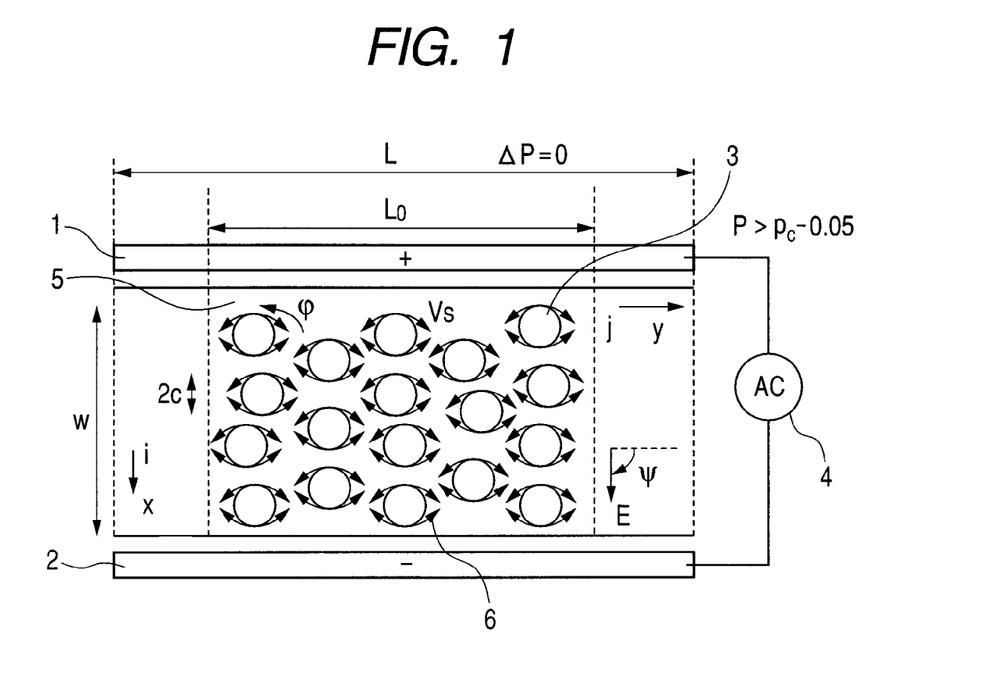
FIG. 1 is a schematic sectional view of an embodiment of the fluid structure control device of the present invention.

FIG. 1 is a schematic sectional view of an embodiment of the fluid structure control device of the present invention. In FIG. 1, the numerals denote the following: 1 and 2, a pair of electrodes; 3, a conductive particle having a radius C (suspended conductive structure); 4, a power source for applying an AC voltage; 5, a liquid chamber having a width w (e.g., 100 μm), a length L (e.g., 225 μm), and a depth d2 (>w), serving also as a flow channel for the fluid; 6, an electro-osmotic flow produced around the conductive particle 3 by an induced-charge electro-osmosis phenomenon on application of an electric field. The symbols denote the following; i, the x direction; j, the y direction; E, the electric field vector direction; Ψ, an angle of the electric field vector E to the y axis.

The liquid chamber holds a solution containing an electrolyte dissolved therein and conductive particles dispersed in the solution. It is filled with water or a polarizable solution such as an aqueous solution of electrolyte. The "electrolyte" in the present invention refers to a substance which is soluble in water and allows an electric current to flow when dissolved in water, the electrolyte including potassium chloride, sodium chloride, hydrogen chloride, copper chloride, and sodium hydroxide.

The conductive particles includes suspended particles of conductive structure material, and composite particles of a conductive structure material in contact with an insulating material, including specifically conductive fine particles of gold, platinum, carbon and the like; and composite particles of the conductive fine particles with an insulating material like $SiO_2$. The conductive particles may be in a shape of a sphere, an oval sphere, a polyhedron, or the like, and are preferably in a size ranging from about 1 μm to about 50 μm so that their Brownian movement can be neglected and their colloidal dispersion state can be kept when no electric field is applied.

The term "fluid structure" signifies a fine structure of a fluid containing the above conductive particles dispersed therein.

In the present invention, an electric field generated by application of a voltage from the electrodes causes an electro-osmotic flow to occur in the region of the electric double layer around electric charges induced on the conductive particles. This electro-osmotic flow causes a fluid-dynamic interaction among the conductive particles to displace the conductive particles and to change reversibly the dispersion state of the conductive particles or the conductive composite particles in accordance with the applied voltage.

The device of the present invention includes those which have, in the liquid chamber, conductive particles having a volume occupied ratio (of particles) p of $p > p_c - 0.045$, where the threshold of a bond percolation in a body-centered cubic lattice (bcc) is represented by $p_c$ (=0.18).

In the device of the present invention, the driving angular frequency ω of the applied AC voltage may be selected in the range of $\tau_e^{-1} < \Omega < \tau_p^{-1}$, where $\tau_e = w\lambda_D/2D$ and $\tau_p = w_s\lambda_D/2D$, where $\lambda_D$ is a Debye length, D is an molecular diffusivity for ion in the solution of the electrolyte, $w_s = (w/N_{bx}) - 2c$, c is a radius of the conductive particle, $N_{bx}$ is an average number of the particles one-dimensionally-counted in a direction perpendicular to the electrode, and w is a distance between the electrodes.

The device of the present invention may have the liquid chamber having a channel width of 1 mm or less, and a pair of electrodes at an electrode distance of 1 mm or less.

In the device of the present invention, a columnar structure is formed by aligning the conductive particles to be perpendicular to the direction of electrode-to-electrode of the pair of electrodes by application of the voltage.

The present invention covers a device for controlling the viscosity of the fluid in the liquid chamber by application of a voltage.

The device of the present invention may comprise further a unit for detecting impedance between the electrodes.

The present invention covers an actuator which has, in the liquid chamber, a piston connected to an outside member and connected at the other side to a perforated cage for holding the conductive particles, and moves the piston by displacement of the conductive particles on application of a voltage.

A device is known which changes dynamically the viscosity of a fluid by formation of a columnar structure (e.g., Document-3). In such a device, dielectric particles like silica or conductive fine particles like carbon are dispersed in a non-polarizable insulating fluid like a silicone oil between electrodes, and a columnar structure is formed in the direction of the electric field by utilizing the interaction among particles caused by an electric dipole moment generated among the particles on application of an electric field. However, no device is known which controls dynamically the viscosity or like properties by changing the structure of fine particles by utilizing fluid-dynamic interaction among the fine particles in water or an electrolyte solution like an aqueous KCl solution.

In application to micro-TAS or DNA analysis, a technique is needed which controls dynamically a fine particle structure in water or an electrolyte solution like an aqueous KCl solution.

The present invention relates to a novel multi-particle system utilizing a fluid-dynamic interaction among conductive particles or conductive composite particles in an electrolyte solution, not in a non-polarizable insulating fluid system like an oil.

For application to micro-TAS or DNA analysis, the applied voltage should be lowered and the device should be miniaturized and integrated. However, when the applied voltage is lowered and the interelectrode distance is made shorter than about 1 mm to miniaturize the device, an electric field may not be applied to the device due to a shielding effect caused by polarization of the electrodes. Consequently, the device may not be driven and the device performance may remarkably be deteriorated. In those cases, there is a possibility that the device is not driven with a low voltage.

For application to fluid IC, to achieve improved integration of the device, a pair of electrodes should preferably be placed above the substrate at a height of not less than 5 μm, more preferably not less than 10 μm, and the conductive particles or conductive composite particles should be arranged placed between the electrodes for operation of the device.

The present invention relates to a device which comprises a liquid chamber filled with an electrolyte solution, plural conductive particles or conductive composite particles suspended and dispersed in the solution in the liquid chamber, and electrodes placed near the liquid chamber to apply an AC electric field to the conductive particles. In the device, upon the application of the electric field, an electro-osmotic flow occurs in the region of electric double layer induced in the vicinity of charges induced on the conductive particles to cause interaction among the conductive particles.

In this device, the volume occupancy p of the conductive particles may be $p > p_c - 0.045$, where $p_c$ is a threshold of the bond percolation in the bcc lattice, which is three-dimensional percolation threshold between the electrodes. Further, in this device, the driving angular frequency ω of the AC electric field may be in the range: $\tau_e^{-1} < \omega < \tau T_p^{-1}$ where $\tau_e$ ($\tau_e = w\lambda_D/2D$) is a charging time for the electric double layer of the electrode, $\tau_p$ ($\tau_p = w_s\lambda_D/2D$) is a charging time for the electric double layer of the suspended conductive particles. In that case, the control of the change in the structure of the conductive particles or conductive composite particles by the electro-osmosis is facilitated, thereby providing a fluid structure control device with high performance.

The charging time $\tau_p$ for the electric double layer of the conductive particles constituted of dielectric suspended particles is a time required for formation of electric double layer on the interface between the polarizable solution such as water or an aqueous KCl solution and the conductive particles. The time is a characteristic time necessary for producing a fluid flow by the electro-osmosis around the conductive particles to generate fluid-dynamic attraction between the suspended conductive particles arranged in the direction of electric field and to generate fluid-dynamic repulsion between the conductive particles arranged to be perpendicular to the direction of electric field. The time is characteristic to the electro-osmosis device utilizing the interaction caused by the electro-osmosis flow. The time is not observed in a device utilizing an electric dipole moment.

When an electric double layer is induced on the conductive particles constituted of a suspended dielectric matter, the electric field perpendicular to the conductive particle surface becomes zero, and the charges and electric dipole moments induced on the conductive particles are shielded by ions of an opposite charge in the vicinity of the surface of the conductive particles, so that the interaction caused by the electric dipole moment does not work.

That is, the device of the present invention is driven at a driving angular frequency of the AC electric field of $\tau_e^{-1} < \omega < \tau_p^{-1}$. Therefore the device is completely different from a conventional device utilizing an electric dipole moment.

Further, the present invention employs a polarizable electrolyte solution containing conductive particles or conductive composite particles dispersed therein, which fluid can usually be regarded as conductive. The fluid employed in the present invention is fundamentally different from conventional electro-rheological fluids composed of a non-polarizable insulating fluid like a silicone oil containing dielectric particles like silica particles or conductive particles like carbon particles dispersed therein.

The fluid structure control device of the present invention produces the necessary structural change for exercising sufficient performance by placing, in a pair of electrodes, an electrolyte solution containing conductive particles with a volume occupancy more than an approximate percolation threshold to raise the probability of columnar structure formation. Further, in the device of the present invention, an AC electric field of $\tau_e^{-1} < \omega$ may be applied to produce such an effect that a shielding effect is prevented from arising from the polarization of the electrodes holding an electrolyte solution therebetween and an electric field can effectively be applied to the conductive particles. Further, the application of an AC electric field of $\omega < \tau^{-1}$ may give a sufficient electric-field-charging time for generation of the electric double layer around the individual conductive particles.

Thereby, the electro-osmotic flows of a high characteristic speed can be produced around the conductive particles by an induced charge electro-osmosis phenomenon to generate a large fluid-dynamic interaction among the conductive particles to form a columnar structure from the conductive particles at a high speed. Even with a small interelectrode distance of not more than 1 mm, the shielding effect caused by the electrode polarization can be prevented, which enables high speed formation of the columnar structure of conductive particles in the electrolyte solution when the device is driven at a low voltage.

The present invention enables high-speed formation of the effective columnar structure from conductive particles in driving the device at a low voltage by placing the conductive particles having a volume occupancy of higher than the approximate percolation threshold in an electrolyte solution between the electrodes and by applying an AC electric field of $\tau_e^{-1} < \omega < \tau_p^{-1}$.

The term "columnar structure" herein signifies a structure formed of the conductive particles in a chain-like reversible arrangement caused by the fluid-dynamic interaction of the particles in the direction of electric field.

Example 1

The fluid structure control device of this Example 1 is described with reference to FIG. 1. In this drawing, the numerals denote the following: 1 and 2, a pair of electrodes; 3, a suspended conductive particle having a radius C; 4, a power source; 5, a liquid chamber having a width w (=100 μm), a length L (=225 μm), and a depth d2 (>w), serving also as a flow channel of the fluid, flow channel being filled with a polarizable solution such as water and an aqueous electrolyte solution; 6, an electro-osmotic flow produced around the conductive particles by the induced-charge electro-osmosis phenomenon upon application of an electric field. The pair of electrodes 1, 2 applies a DC or AC electric field to the flow channel.

In this Example, the liquid chamber 5 is filled with an electrolyte solution, conductive particles 3 are dispersed in the electrolyte solution in the liquid chamber 5, and electrodes are placed near the liquid chamber for applying an AC electric field to the conductive particles 3. The applied electric field induces charges in the suspended conductive particles and produces electric double layers around the charges to cause electro-osmotic flows and interaction among the suspended conductive particles 3.

For example, an electro-osmosis device of a high performance can be provided which enables easy control of change in the structure of conductive particles, under the following conditions: the volume occupancy of the suspended particles, p is preferably $p > p_c - 0.045$, where $p_c$ represents a three-dimensional percolation threshold between the electrodes; and the driving angle frequency ω of the AC electric field is preferably in the range of $\tau_e^{-1} < \omega < \tau_p^{-1}$, where $\tau_e$ is a charging time for the electrodes: $\tau_e = w\lambda_D/2D$, and $\tau_p$ is a charging time for the particles: $\tau_p = w_s\lambda_D/2D$ where $\lambda_D$ is a Debye distance, D (~$10^{-9}$ m²/s) is an ion molecular diffusivity in the solution of the electrolyte, $w_s = (w/N_{bx}) - 2c$, c is a radius of the conductive particles, $N_{bx}$ is an average number of the particles one-dimensionally-counted in a direction perpendicular to the electrode, and w is a distance between the electrodes and the breadth of the fluid channel.

When the electrolyte solution is water, $\lambda_D$ is ~1 nm. At w=100 μm, $N_{bx}$=4, and c/w=0.08, then $w_s/w$=0.09, $\tau_e$=0.05 ms, and $\tau_p$=0.018 ms. In this case, the driving angular frequency of the AC electric field ranges 20 krad/s<ω<222 krad/s. At the particle number density of n, $N_{bx}$=wn$^{1/3}$.

In this Example, plural conductive particles having a volume occupancy of higher than an approximate percolation threshold are placed in the electrolyte solution between the electrodes. Thereby a columnar structure can be formed from the conductive particles at an increased probability to cause a structure change necessary for exhibiting sufficient performance.

The application of AC electric field of $\tau_e^{-1} < \omega$ can prevent the shielding effect from being caused by polarization of the electrodes holding the electrolyte solution and enables an effective electric field to be applied to the suspended conductive particles.

The application of an AC electric field of $\omega < \tau_p^{-1}$ can give an electric-field-charging time for generation of an electric double layer around the respective conductive particles.

Consequently, electro-osmotic flows having a characteristic high speed are produced around the conductive particles by the induced-charge electro-osmosis phenomenon to cause a large fluid-dynamic interaction among the conductive particles to form a columnar structure of the conductive particles at a high speed.

FIGS. 2A, 2B, 2C, 2D, 2E and 2F illustrates examples of effects obtained by driving of a fluid structure control apparatus of the present invention, showing distribution of flow velocity vectors and arrangement of circular conductive particles 3 in the flow channel upon application of a voltage between the electrodes 1 and 2. The flow velocity is calculated by the Stokes equation in consideration of the induced-charge osmosis effect, assuming: w=100 μm, L/w=2.25, $L_0$/w=1.3, b/w=0.4, c/w=0.08, and applied voltage $V_0$=1.88 V. In that case, $L_0$ is a calculation parameter for limiting the displacement range of the particles as illustrated in FIG. 1 and for defining the condition of the number density of the particles, N/($L_0$w) for a limited particles N(=18).

FIGS. 2A, 2B, 2C, 2D, 2E and 2F illustrate calculation results respectively for t=0, 80, 195, 395, 700, and 1,000 ms. The micro-columnar structures are formed at t=195 ms, and the micro-columnar structures are maintained in a substantially stable state during the period from t=195 ms to t=1,000 ms with a little fluctuation of the structures.

Figure 2A:
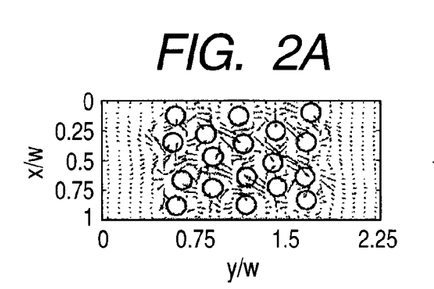
FIGS. 2A, 2B, 2C, 2D, 2E and 2F illustrate effects of driving of the fluid structure control device of the present invention.
Figure 2B:
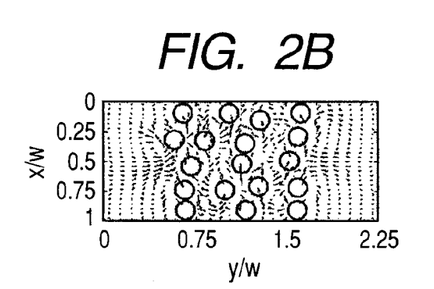
Figure 2C:
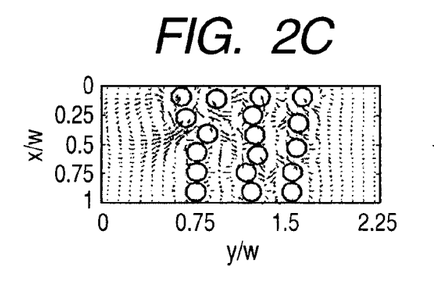
Figure 2D:
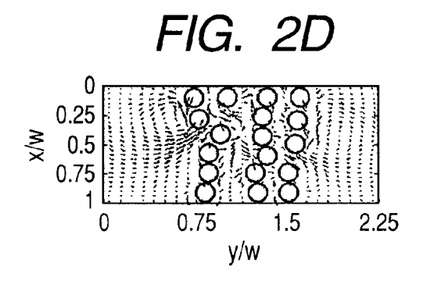
Figure 2E:
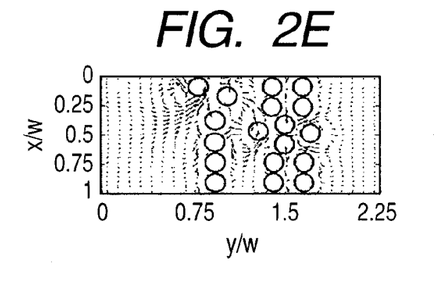
Figure 2F:
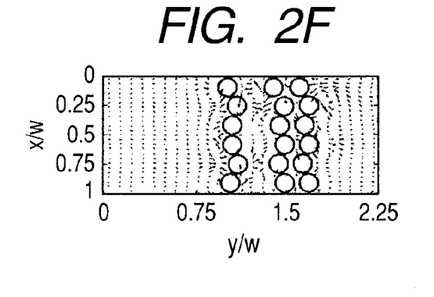

FIGS. 2E and 2F show that the micro-structures are kept in a substantially stable state during the application of electric field. The present invention provides a high-performance electro-osmosis device which has the liquid chamber 5 of a flow channel having a breadth of not more than 1 mm and enables micro-columnar structures to be formed in the direction perpendicular to the electrodes by the application of an electric field.

Figure 3A:
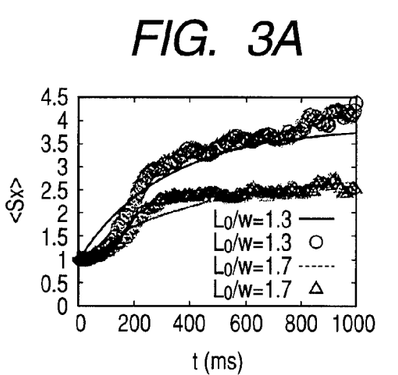
FIGS. 3A, 3B, 3C and 3D illustrate results of driving of the fluid structure control device of the present invention.

FIGS. 3A, 3B, 3C and 3D illustrate the results of driving of a fluid structure control device of the present invention. FIG. 3A shows a change of <Sx> with time: Sx is a parameter indicating a cluster size of the respective samples in the x direction (direction of electric field); and <Sx> is an average for Ns times (=20) of the trials.

FIG. 3A also shows that the cluster in the x direction comes close to a certain level in about 400 ms. This demonstrates that the micro-columnar structure will be formed in the electric field direction, not by chance.

Figure 3B:
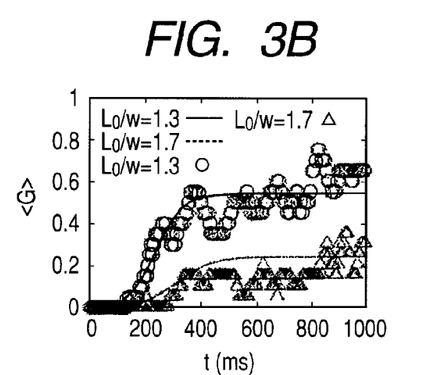
Figure 3C:
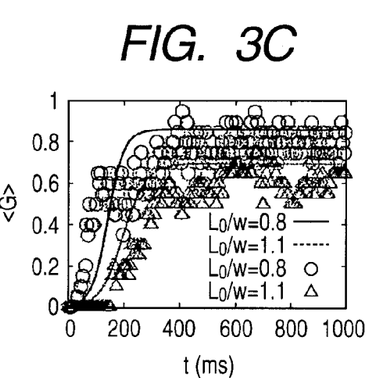

FIGS. 3B and 3C show changes of <G> with time: G is a parameter, G being 1 when the electrodes are connected by the particles and being 0 when the electrodes are not connected; and <G> is an average for Ns times (=20) of the trials. FIGS. 3B and 3C show that the value of <G> comes close to a certain level in about 400 ms. This demonstrates that the micro-columnar structure of the conductive particles 3 connecting the upper and lower electrodes will be formed, not by chance.

Further, the scaling relation, $<G> = P(L_0)fc(t)$, is valid according to calculation, where $P = <G>_{t=\infty} = 1/(\exp((L_0 - L_0^{th})/\Delta L_0 + 1))$, and fc is a formula relating to the cluster formation, being 1 when the t is sufficiently large.

Figure 3D:
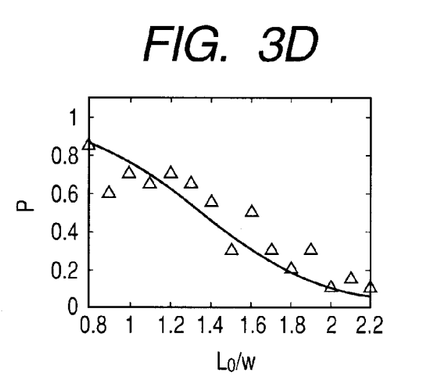

FIG. 3D shows the dependence of P on $L_0$/w, derived by numerical calculation (denoted by symbols of Δ) and derived by the above scaling relation (denoted by the dotted line), where $L_0^{th}$=1.35, and $\Delta L_0$=0.3. From FIG. 3D, the threshold of $L_0$ for <G> is in the range from about 1.2 to about 1.6. This corresponds to a volume occupancy ranging from 0.29 to 0.38, which is approximate to the threshold level of 0.35 of the bond percolation for two-dimensional triangular lattice. Here, the range Δpc of the threshold of the volume occupancy is: Δpc=0.38−0.29=0.09. Therefore, <G> changes abruptly for the volume occupancy p from 0 to about 1 at the threshold breadth Δpc=0.09 at the percolation threshold pc of about 0.1.

Further, the threshold of the bond percolation for the three dimensional bcc lattice is pc=0.18. Therefore, in an actual three dimensional system, the present invention relates to an electro-osmosis device utilizing the formation of an effective micro-columnar structure in an electric field at p>pc−$\Delta L_0$/2=0.18−0.09/2=0.18−0.045=0.135, namely p>0.135, at a flow channel breadth of 1 mm or less and in a state of Stokes flow with a low Reynolds number of 100 or less without causing a turbulent flow. This device is fundamentally different from the micro-wire formation technique utilizing electric-field-concentration at a surface projection.

Example 2

Figure 4:
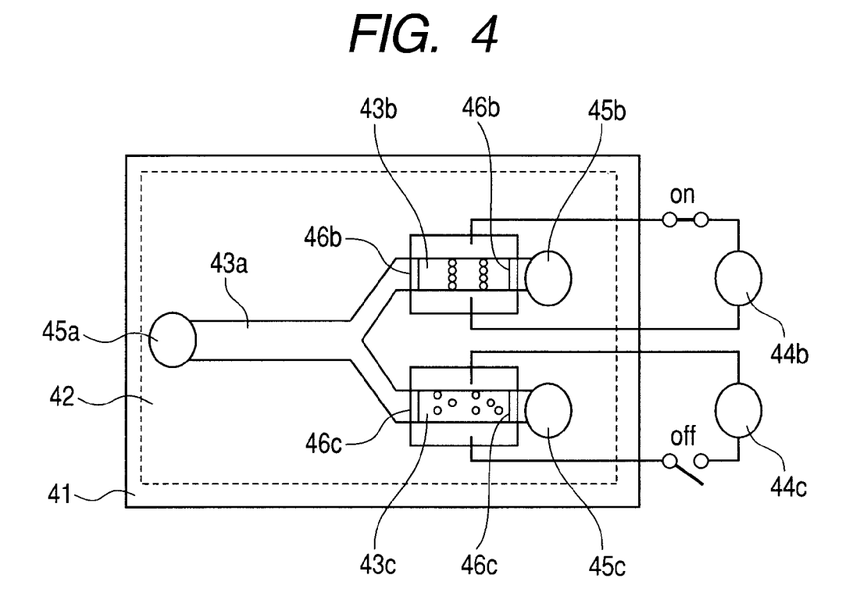
FIG. 4 is a schematic sectional view illustrating another embodiment of the fluid structure control device of the present invention.

FIG. 4 is a schematic sectional view illustrating another embodiment of the fluid structure control device in Example 2 of the present invention. In FIG. 4, the numerals denote the following: 41 and 42, an upper substrate and a lower substrate; 43a, 43b and 43c, respectively first, second and third flow channels; 44b and 44c, respectively voltage applying means; 45a, a fluid inlet; 45b and 45c, respectively fluid outlets; 46b and 46c, respectively filters for holding the suspended structural particles.

Example 2 is the same as Example 1 except that the macroscopic viscosity of the liquid in the liquid chamber is controlled by application of an electric field. The flow of the fluid from the first flow channel to the second flow channel and to the third flow channel is controlled by the on-off control of voltages applied by the voltage-applying means 44b and 44c. Specifically, the application of a voltage to the voltage-applying means 44b forms a micro-columnar structure in the first flow channel to increase the apparent flow resistance in the first flow channel and, as a result, the flow of the fluid can be retarded. Otherwise, the flow of the fluid to the third flow channel can be facilitated by the off operation of the application of a voltage to the voltage application means 44c. Thus, the device of this Example is useful as a fluid valve.

Example 3

Figure 5:
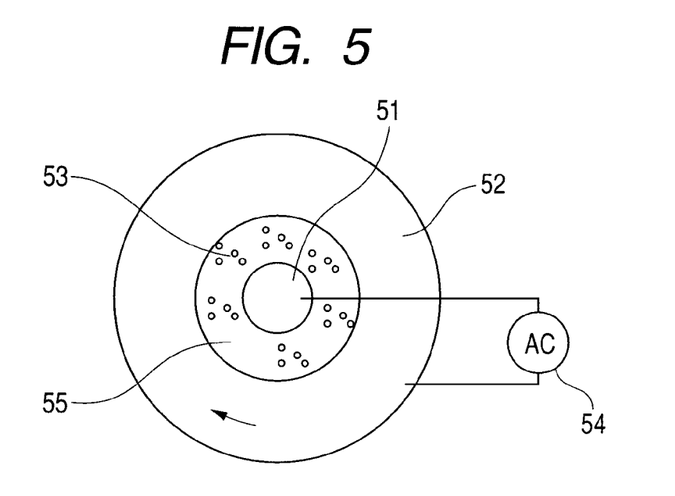
FIG. 5 is a schematic sectional view illustrating still another embodiment of the fluid structure control device of the present invention.

FIG. 5 is a schematic sectional view illustrating another embodiment of the fluid structure control device in Example 3 of the present invention. In FIG. 5, the numerals denote the following: 51, a fixed electrode serving as a rotation axis; 52, a rotating electrode; 53, a suspended conductive particle; 54, a voltage-applying means; 55, a liquid chamber.

Example 3 is the same as Example 1 except that the macroscopic viscosity of the liquid in the liquid chamber is controlled by application of an electric field. In this Example, the macroscopic viscosity of the fluid between the electrodes is increased by the formation of a micro-columnar structure between the electrodes upon application of a voltage to control the rotation speed of the rotating electrode 52. Thus, the device of this Example is useful as a brake.

Example 4

Figure 6:
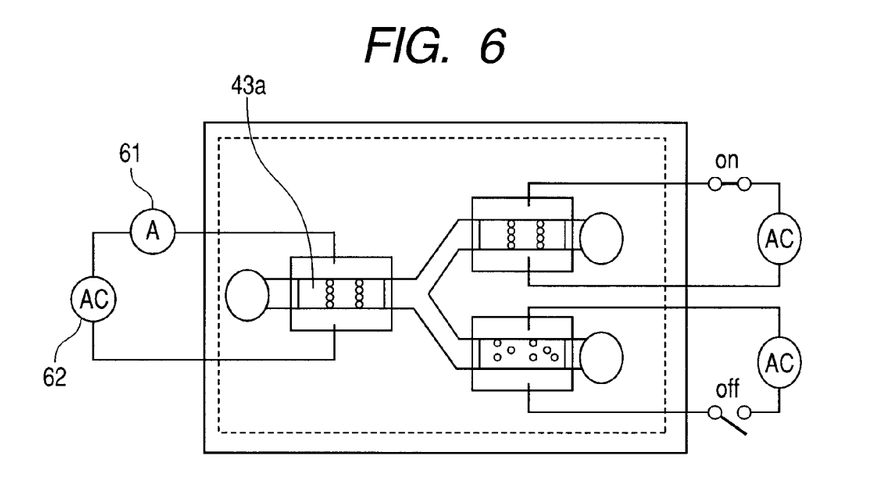
FIG. 6 is a schematic sectional view illustrating still another embodiment of the fluid structure control device of the present invention.

FIG. 6 is a schematic sectional view illustrating another embodiment of the fluid structure control device in Example 4 of the present invention. Example 4 is the same as Example 2 except that the device is equipped with an electro-osmosis device unit which has a detector 61 for detecting the impedance between the electrodes and which consequently detects the impedance change between the electrodes caused by the change in the arrangement of the suspended conductive particles upon the application of an electric field.

In this Example, a micro-columnar structure is formed by application of a voltage to the first flow channel 43a through the voltage-applying means 52, and the change in the properties of the fluid flowing through the flow channel is detected dynamically by the measurement of impedance with the impedance detecting unit 61.

Example 5

Figure 7:
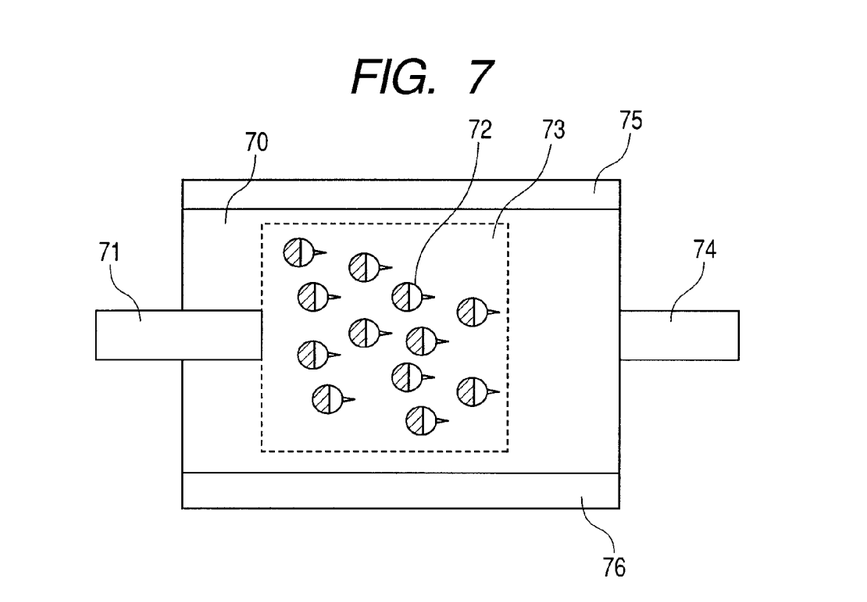
FIG. 7 is a schematic sectional view illustrating still another embodiment of the fluid structure control device of the present invention.
Figure 8A:
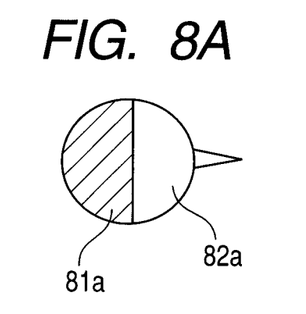
FIGS. 8A, 8B, 8C and 8D are schematic drawings of examples of the suspended conductive particle having an asymmetric structure or having a conductive portion in contact with an insulating structure.
Figure 8B:
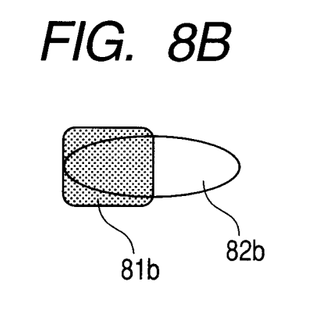
Figure 8C:
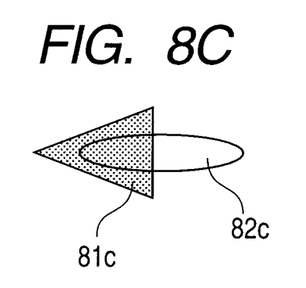
Figure 8D:
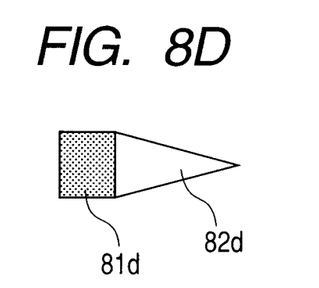

FIG. 7 is a schematic sectional view illustrating another embodiment of the fluid structure control device in Example 5 of the present invention. The device of Example is characterized in that it has a piston 71 for connecting the liquid chamber 70 to the outside equipment. The piston is connected also to a perforated cage 73 for holding the suspended conductive particles 72. The suspended conductive particles 72 are asymmetric in shape or have a conductive portion brought into contact with an insulating structure. This Example is the same as Example 1 except that the piston 71 is moved in parallel by the application of an electric field. The device is advantageous in constituting an actuator. In FIG. 7, the numeral 74 denotes a member for supporting the liquid chamber 70, and the numerals 75 and 76 denote respectively electrodes.

FIGS. 8A, 8B, 8C and 8D illustrate schematically examples of the suspended particles which are asymmetric in shape and have a conductive portion in contact with an insulating structure. In FIGS. 8A, 8B, 8C and 8D, the symbols 81a, 81b, 81c and 81d denote respectively an insulating portion of the particles, and the symbols 82a, 82b, 82c and 82d denote respectively a conductive portion of the particles.

In FIG. 7, the application of the electric field enables the displacement of the suspended conductive particles in one direction owing to the effect of the asymmetry. The device is advantageous in that the piston can be displaced relative to the liquid chamber by use of the perforated cage 73 connected to the piston 71.

Example 6

Figure 9:
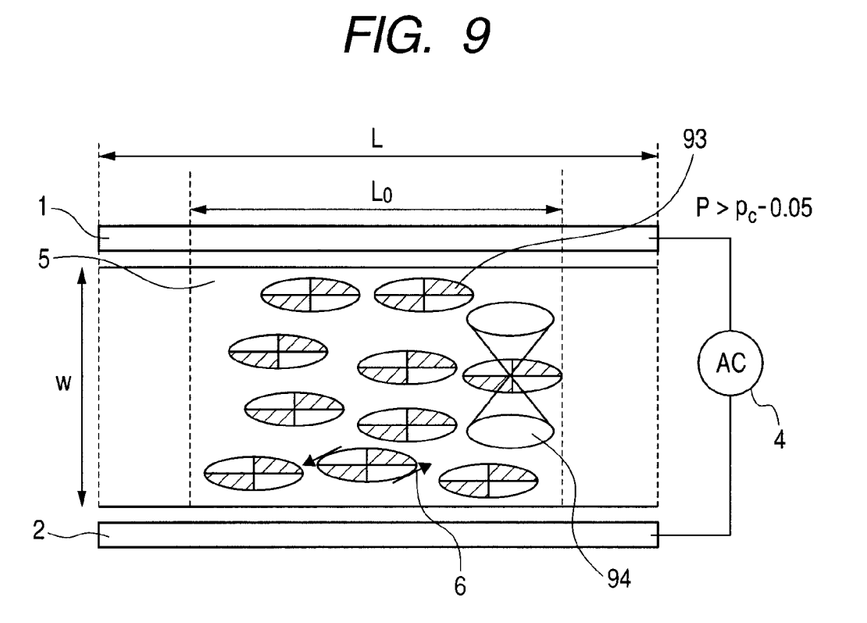
FIG. 9 is a schematic sectional view illustrating still another embodiment of the fluid structure control device of the present invention.

FIG. 9 is a schematic sectional view illustrating another embodiment of the fluid structure control device of the present invention. The device illustrated in FIG. 9 is the same as that in Example 1 except that conductive particles 3 were replaced with composite particles 93 having an insulating part and a conductive part in its rotationally symmetric position (or composite particles having an insulating part and a conductive part having different shape from that of the insulating part).

The device of the present example can change reversibly the dispersion state of the composite particles in accordance with the applied voltage. Thus, the device enables the macro conductive property, macro viscous property or macro optical property of the solution to be controlled.

In this Example, the ellipsoidal composite particles having an insulating part and a conductive part in its rotationally symmetric position as shown by numeral 93 in FIG. 9 are made stable in the direction of a sloping bearing in a cone shape as shown by numeral 94 and hence have a stable position similar to that of the smectic C type liquid crystal, thereby producing technical effect that complicated dynamic control can be conducted.

Also when composite particles having an insulating part and a conductive part having different shape from that of the insulating part are used in place of the composite particles 93, the composite particles lose a symmetry and are stabilized at the position inclined relative to the direction perpendicular to the electrodes, thereby bring about technical effect that complicated dynamic control can be carried out.

The composite particles 93 can be prepared by the vapor deposition technique in which the metallic part is masked or by the patterning technique such as photolithography.

The fluid structure control device of the present invention can change the dispersion state of conductive particles or conductive composite particles in a solution containing an electrolyte dissolved therein by application of an AC voltage. Therefore, this device can be applied as a fluid valve, an actuator, a sensor, an optical control element, and like equipments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-169375, filed on Jul. 17, 2009, which is hereby incorporated by reference herein in its entirety.

What is claimed is:

1. A fluid structure control device comprising a liquid chamber holding a solution containing an electrolyte dissolved therein and conductive particles dispersed in the solution, and a pair of electrodes for applying an AC voltage to the conductive particles in the liquid chamber; said device causing electro-osmotic flows to occur due to electric double layers induced at the interface between the solution and the conductive particles by application of a voltage, thereby producing interaction among the conductive particles to displace the conductive particles and to change reversibly the dispersion state of the conductive particles in accordance with the applied voltage, wherein the conductive particles in the liquid chamber have a volume occupancy p of $p > p_c - 0.045 = 0.135$ where $p_c = 0.18$ is a threshold of bond percolation for a body-centered cubic lattice.

2. The fluid structure control device according to claim 1, wherein the conductive particles in the liquid chamber have a volume occupancy p of $p > p_c - 0.045$, where $p_c$ is a threshold of bond percolation for a body-centered cubic lattice.

3. The fluid structure control device according to claim 1, wherein the applied AC voltage has a driving anglar frequency ω in the range of $\tau_e^{-1} < \omega < \tau_p^{-1}$, where $\lambda_D$ is a Debye length, D is an ion molecular diffusivity of the electrolyte solution, $w_s = (w/N_{bx}) - 2c$, c is a radius of the conductive particles, $N_{bx}$ is an average number of particles one-dimensionally-counted in a direction perpendicular to the electrode, and w is a distance between the electrodes, $\tau_e = w\lambda_D/2D$, and $\tau_p = w_s\lambda_D/2D$.

4. The fluid structure control device according to claim 1, wherein the width of a channel in the liquid chamber and the distance between the electrodes are respectively not more than 1 mm.

5. The fluid structure control device according to claim 1, wherein the conductive particles are arranged in a direction perpendicular to the direction of electrode-to-electrode of the pair of electrodes by application of the voltage to form a columnar structure of the conductive particles.

6. The fluid structure control device according to claim 1, wherein the viscosity of the fluid in the liquid chamber is controlled by application of the voltage.

7. The fluid structure control device according to claim 1, wherein the device further comprises a unit for detecting impedance between the electrodes.

8. The fluid structure control device according to claim 1, wherein the conductive particles are composed of composite particles that comprise an insulating part and a conductive part in its rotationally symmetric position, or composite particles that comprise an insulating part and a conductive part having different shape from that of the insulating part.

9. The fluid structure control device according to claim 8, wherein conductive property, viscous property, or optical property of the solution is controlled.

10. A fluid structure control device comprising a liquid chamber holding a solution containing an electrolyte dissolved therein and conductive particles dispersed in the solution, and a pair of electrodes for applying an AC voltage to the conductive particles in the liquid chamber; said device causing electro-osmotic flows to occur due to electric double layers induced at the interface between the solution and the conductive particles by application of a voltage, thereby producing interaction among the conductive particles to displace the conductive particles and to change reversibly the dispersion state of the conductive particles in accordance with the applied voltage, wherein the device has, in the liquid chamber, a piston connected to the outside, the piston being coupled with a perforated cage for holding the conductive particles, wherein the conductive particles are displaced by the application of the voltage to displace the piston.

* * * * *